United States Patent [19]
Hwang

[11] Patent Number: 5,822,084
[45] Date of Patent: Oct. 13, 1998

[54] TECHNIQUE FOR DISPLAYING A TRANSMISSION ERROR PAGE OF A FACSIMILE MACHINE

[75] Inventor: Tae-Heum Hwang, Seoul, Rep. of Korea

[73] Assignee: SamSung Electronics Co., Ltd., Suwon, Rep. of Korea

[21] Appl. No.: 761,877

[22] Filed: Dec. 9, 1996

[30] Foreign Application Priority Data

Dec. 8, 1995 [KR] Rep. of Korea .................. 1995/47936

[51] Int. Cl.$^6$ ................................ H04N 1/00; H04N 1/32
[52] U.S. Cl. ........................................... 358/437; 358/405
[58] Field of Search .................................. 358/400, 405, 358/437, 441

[56] References Cited

U.S. PATENT DOCUMENTS

| | | | |
|---|---|---|---|
| 4,224,641 | 9/1980 | Kanda | 358/441 |
| 4,970,599 | 11/1990 | Nobuta | 358/437 |
| 5,057,941 | 10/1991 | Moriya | 358/440 |
| 5,124,798 | 6/1992 | Tanabe et al. | 358/437 |
| 5,127,013 | 6/1992 | Yoshida | 358/405 |
| 5,130,805 | 7/1992 | Rikima | 358/405 |
| 5,134,501 | 7/1992 | Satomi et al. | 358/405 |
| 5,227,894 | 7/1993 | Yoshida | 358/441 |
| 5,295,182 | 3/1994 | Fujii | 358/441 |
| 5,333,062 | 7/1994 | Hara et al. | 358/437 |
| 5,335,085 | 8/1994 | Nakatsuma | 358/437 |

FOREIGN PATENT DOCUMENTS

| | | | |
|---|---|---|---|
| 5-022491 | 1/1993 | Japan | H04N 1/00 |

*Primary Examiner*—Kim Yen Vu
*Assistant Examiner*—Kimberly A. Williams
*Attorney, Agent, or Firm*—Robert E. Bushnell, Esq.

[57] ABSTRACT

A technique for displaying transmission error page in a facsimile machine, capable of informing users of a transmission error page upon transmitting an image of a document by a display without further action or operation includes: a display for enabling a plurality of predetermined information representative of an operational status of the facsimile machine to be displayed thereon in accordance with a control signal generated during a transmission; a memory for storing data corresponding to the information representative of the operational status, including any error generation status during the transmission of a document in the facsimile machine, the data representing any error page interrupted by a transmission failure, and a controller for monitoring the error generation status, and for providing the data representing the error page to the display for displaying by accessing the memory upon the occurrence of the transmission failure.

5 Claims, 3 Drawing Sheets

TECHNIQUE FOR DISPLAYING A TRANSMISSION ERROR PAGE OF A FACSIMILE MACHINE

CLAIM OF PRIORITY

This application makes claims all benefits accruing under 35 U.S.C. §119 from an application for APPARATUS FOR DISPLAYING TRANSMISSION ERROR PAGE OF FACSIMILE SYSTEM AND CONTROL METHOD THEREOF earlier filed in the Korean Industrial Property Office on 8 Dec. 1995 and there duly assigned Ser. No. 47936/1995.

BACKGROUND OF THE INVENTION

1. Field of the Invention

The present invention relates to a technique for processing a transmission error in a facsimile machine, and in particular to a technique for displaying information, such as the page or position where an error has occurred, by a symbol or letter.

2. Description of the Related Art

Generally, when a document is transmitted using a facsimile machine, an error is often generated due to various reasons. Because users often don't know where error has occurred, it is inconvenient for them to use the facsimile machine.

In earlier facsimile machines, the steps for processing a transmission error are as follows. When transmitting and receiving, a determination is first made as to whether or not an error has been generated. If it has been determined that an error was generated, a determination is then made as to whether the generated error corresponds to one of a group command detecting error, a group identification detecting error, a digital identification detecting error, or a digital command signal detecting error. If it has been determined that the generated error corresponds to one of the above-mentioned errors, a "NO ANSWER" message data signal is transmitted to a display of the facsimile machine and the message is displayed on the display thereof. If it has been determined that the generated error did not correspond to one of the above-noted group of errors, then a determination is made as to whether or not the generated error is a transmission or reception error. If it has been determined that it was a transmission or reception error, a "COMM. ERROR" message data signal is transmitted to the display unit of the facsimile machine and the message is displayed thereon.

When transmitting a plurality of documents, if the document transmission is interrupted by a paper jam or line error, the facsimile machine uses a warning display lamp in order to warn the users of the transmission error or selectively prints a message transmission confirmation report and informs the user of the generated status thereof.

When using only the warning display lamp, however, the user is unable to know accurately what page of the document to be transmitted was being transmitted when the transmission was interrupted and it is inconvenient to print the message transmission confirmation report.

U.S. Pat. No. 5,333,062, to Hara et al., entitled Apparatus For Instructing The Handling Of Abnormalities And Mis-operations In A Facsimile Device, discloses an apparatus for storing and reading out abnormality codes for informing a user as to an abnormality in the operation of a facsimile machine.

U.S. Pat. No. 5,295,182, to Fujii, entitled Facsimile Device Having Self-Diagnostic Function And Maintenance And Control Method Thereof discloses a facsimile machine having a self-diagnostic function which displays the trouble to inform the user when there is a problem.

The following patents all disclose facsimile machines in which the users are informed of an error in the operation of the machine: U.S. Pat. No. 5,227,894 to Yoshida, entitled Image Transmission Apparatus With Sheet Number Checking, U.S. Pat. No. 5,134,501 to Satomi et al, entitled Facsimile Apparatus, U.S. Pat. No. 5,057,941 to Moriya, entitled Facsimile Machine, and U.S. Pat. No. 4,224,641 to Kanda, entitled Abnormality Indication System Of Facsimile Apparatus.

It is noted, however, that none of the afore-cited patents teaches or suggests a technique for displaying a transmission error page of a facsimile machine in accordance with the present invention.

SUMMARY OF THE INVENTION

It is therefore an object of the present invention to provide a technique for displaying a transmission error page in a facsimile machine, for informing users of the transmission error page upon transmitting an image of a document using a display of an operating panel without further action or operation.

To achieve the above object of the present invention, the facsimile machine of the present invention uses: a display for enabling a plurality of predetermined information representative of an operational status of the facsimile machine to be displayed thereon in accordance with a control signal generated during transmission; a memory for storing data corresponding to the information representative of the operational status, including error generation status during the transmission of a document in the facsimile machine, the data comprising data representing an error page interrupted by a transmission failure; and a controller for monitoring the error generation status, and for providing the data representing the error page to the display for displaying the error page by accessing the memory upon an occurrence of a transmission failure.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
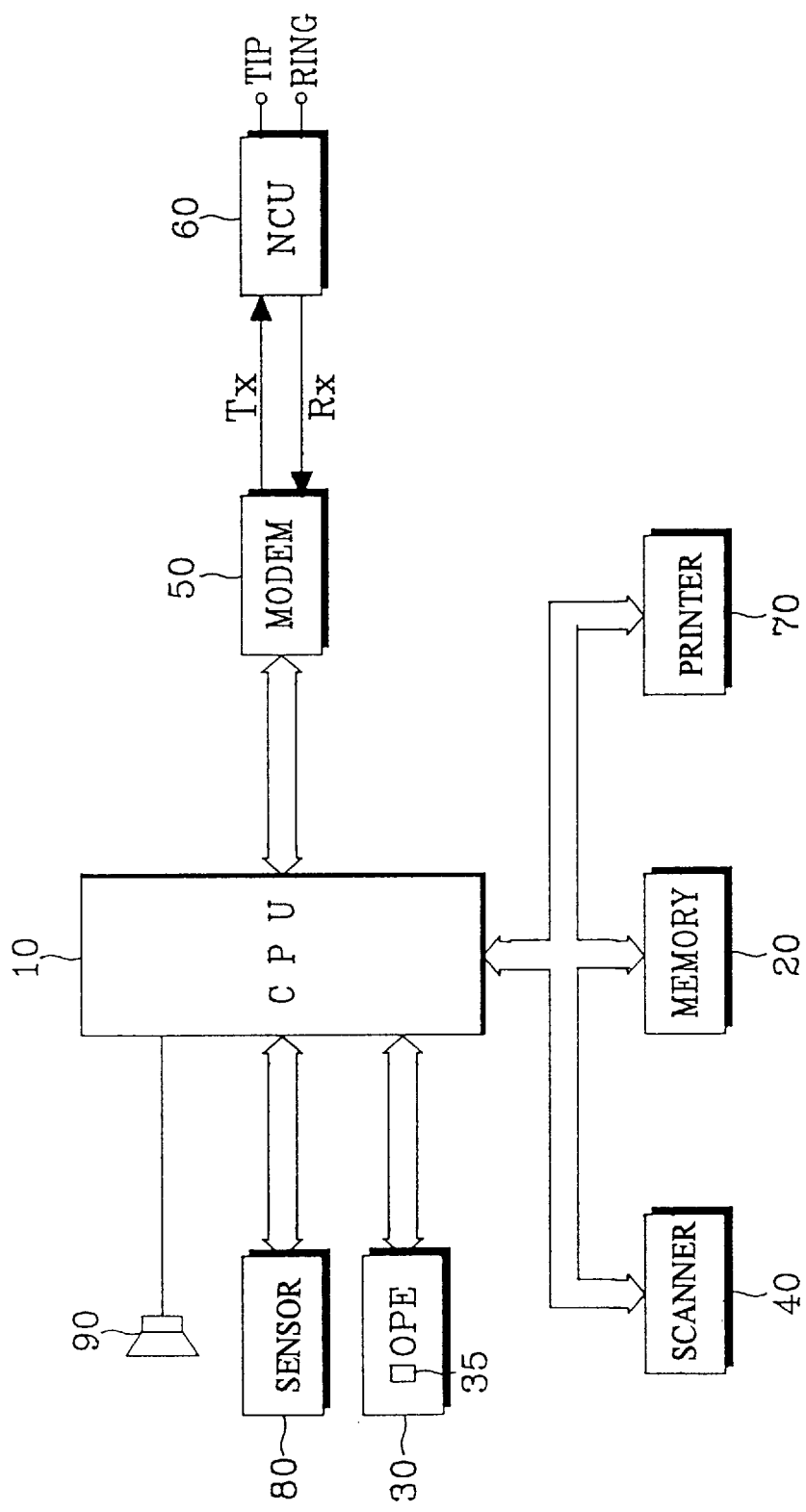
FIG. 1 is a diagram showing construction of a facsimile machine applicable to the present invention.

In FIG. 1, a central processing unit (hereinafter, referred to as a CPU) 10 controls the overall operations of the transmitting and receiving modes and the copy mode of a facsimile machine, in accordance with a set program. The CPU 10 is also capable of storing data in a program memory and a data memory contained therein, or an external memory 20. While the program of the present invention is stored in the program memory, the data generated during the program execution is temporarily stored in the data memory. An OPE (Operating Panel) 30 comprises a key input unit and a display 35, which may be a liquid crystal display. The key input unit of the OPE 30 outputs data to the CPU 10 by generating data when a key is pressed in order to allow a user to designate one of the modes and to cause the machine to perform the mode designated by the user. During execution of a mode by the CPU 10, the display 35 of the OPE 30 also performs its display function by inputting display data representative of the operational status of the facsimile machine. A sensor 80 detects whether or not a document has been input and printing papers are available and outputs the detected status signals to the CPU 10. A scanner 40 moves the inputted document, scans an image of the document, and converts the scanned image into digital data. A printer 70 prints image data inputted upon operation of the machine in the receiving and copy modes under the control of the CPU 10. When in the transmitting mode, under the control of the CPU 10, a modem 50 modulates image data into a transmitting format that is in conformity with the facsimile machine standard and transmits the modulated data. In the receiving mode, the modem 50 demodulates encoded image signal inputted via a transmitting line into an original format. A network control unit (hereinafter, referred to as an NCU) 60 forms transmitting and receiving paths between a telephone line (tip and ring) and the modem 50 under the control of the CPU 10. A speaker 90 outputs a status alarm of the facsimile machine under the control of the CPU 10.

Once a transmitting facsimile machine dials a telephone number of a receiving facsimile machine, a ring signal and a calling tone CNG are detected. The receiving facsimile machine then transmits a called station identification signal CED, a digital identification signal DIS, a called subscriber identification signal CSI, and a non-standard facilities signal NSF to the transmitting facsimile machine. Upon hearing these signal tones, an operator of the transmitting facsimile machine presses a transmitting operation button "SEND" in order to connect the facsimile machine to the telephone line. As a result, the facsimile machine automatically transmits the digital identification signal DIS, a transmitting subscriber identification signal TSI, and a non-standard set-up signal NSS. The transmitting facsimile machine then transmits an express transfer signal to the modem 50. The receiving facsimile machine transmits a confirmation to receive signal CFR, which confirms that its modem is trained and the facsimile machine is ready for receiving signals, and if not ready, transmits a failure to train signal FTT. The transmitting facsimile machine transmits a train signal so that the document is transmitted. If there are further documents to be transmitted, the transmitting facsimile machine transmits a multi-page signal MPS and the receiving facsimile machine transmits a message confirmation signal MCF. A disconnect signal DCN is transmitted by the transmitting facsimile machine and both facsimile machines are disconnected from the telephone line.

Figure 2:
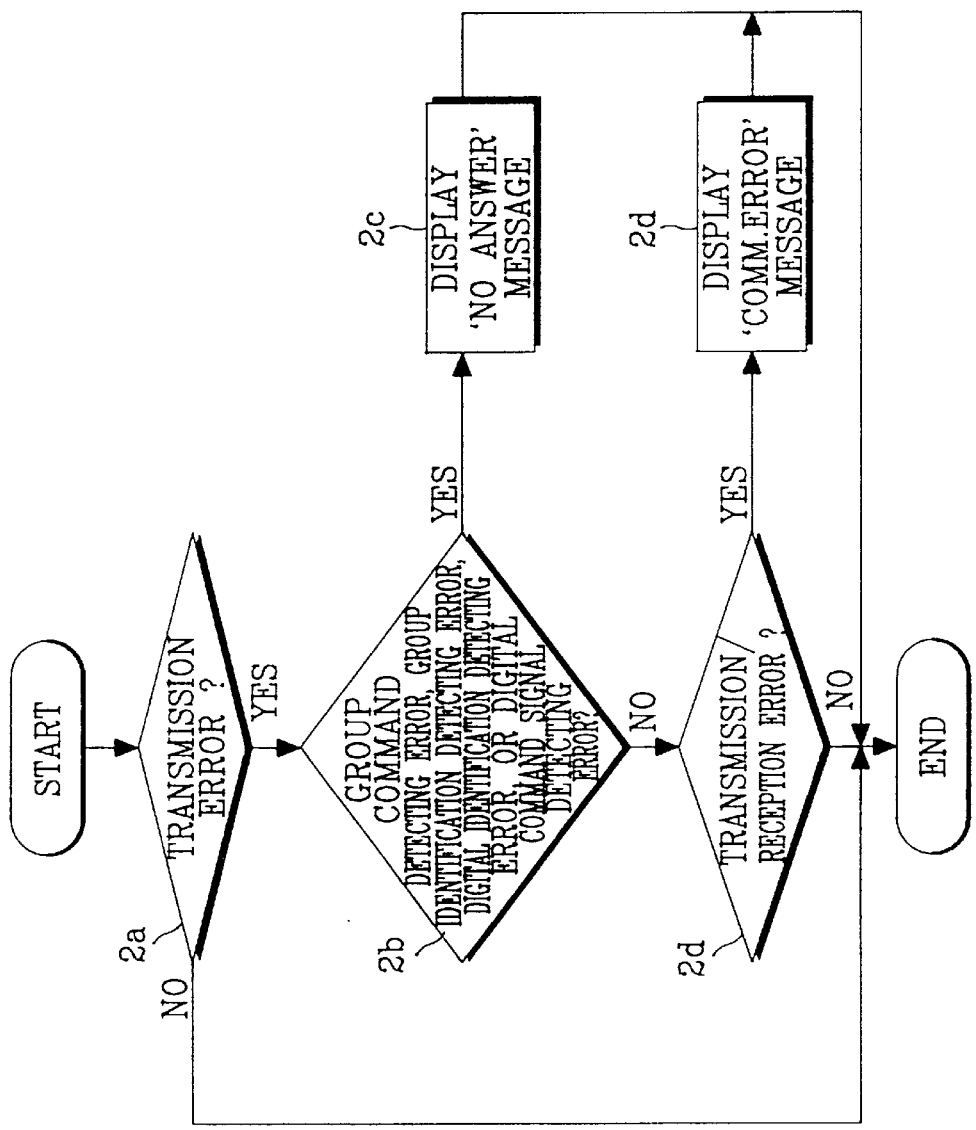
FIG. 2 is a flowchart showing the steps for processing a transmission error of an earlier facsimile machine; and, FIG. 3 is a flowchart showing the steps for processing a transmission error of a facsimile machine in accordance with an embodiment of the present invention.

FIG. 2 is a flowchart showing the steps for processing the transmission error in an earlier facsimile machine. When transmitting and receiving, the CPU 10 checks in step 2a whether or not an error has been generated. As a result, if it has been determined that an error was generated, the CPU 10 checks in step 2b whether or not the generated error corresponds to one of a group command detecting error, a group identification detecting error, a digital identification detecting error, or a digital command signal detecting error. If it is determined that the generated error corresponds to one of the above-mentioned errors, the CPU 10 proceeds to step 2c, and a "NO ANSWER" message data signal is transmitted to the display 35 of the OPE 30, commanding this message to be displayed by the display 35, so that the message is displayed by the display 35. If it has been determined that the generated error did not correspond to one of the group of errors, the CPU 10 determines in step 28 whether or not the generated error is a transmission or reception error. If it has been determined that it was a transmission or reception error, the CPU 10 proceeds to step 2e, and transmits a "COMM. ERROR" message data signal to the display 35 of the OPE 30, commanding this message to be displayed by the display 35, so that the message is displayed by the display 35.

When transmitting a plurality of documents, if the document transmission is interrupted by a paper jam or line error, the facsimile machines use a warning display lamp located in the OPE 30 in order to warn the users of the transmission error or selectively prints a message transmission confirmation report and informs users of the generated status thereof.

When using only the warning display lamp, however, the users are unable to know accurately what page of the document to be transmitted was being transmitted when the transmission was interrupted, and it is inconvenient for them to print the message transmission confirmation report.

Figure 3:
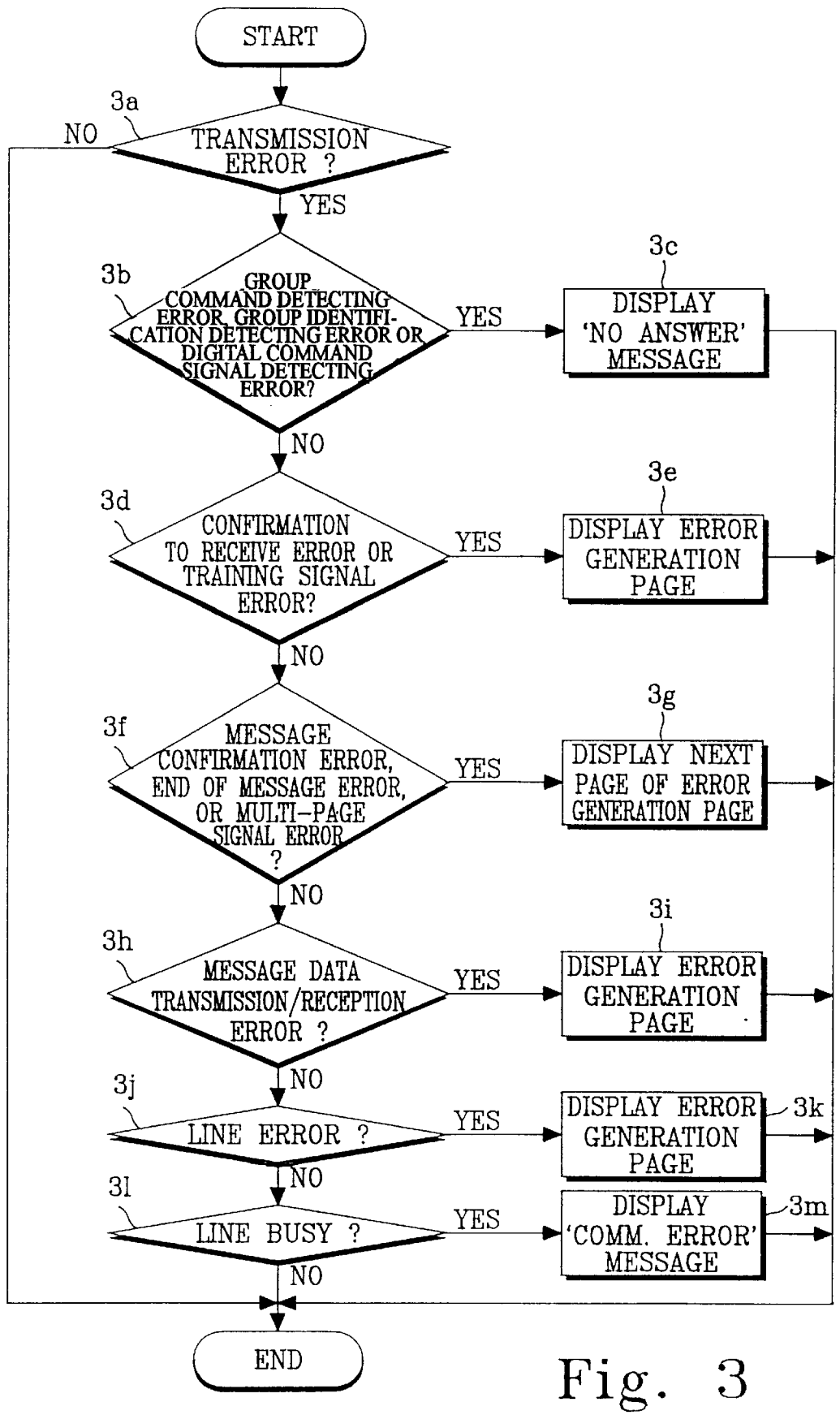

FIG. 3 is a flowchart showing steps for processing a transmission error of a facsimile machine in accordance with an embodiment of the present invention where steps 3a to 3c are equivalent to steps 2a to 2c of FIG. 2.

With reference to FIGS. 1 and 3, upon checking a position of the error generation page, the CPU 10 displays the page on the display 35 by the control of the display 35 of the OPE 30. To perform the above operation, it is necessary to classify the error generation steps checked by the CPU 10 as follows: The first step is the failure to detect signals such as a group command signal GC, a group identification signal GI, a digital identification signal DIS, a digital command signal DCS, etc. The second step is to detect errors such as a confirmation to receive signal CFR error and a training signal error. The third step is to detect errors such as that of a message confirmation signal MCF, a end of message signal EOM, a multi-page signal MPS, etc. The fourth step is to detect a message data transmission error. Finally, the fifth step is to detect an error in a fax line, for example, fall back generated at 2400BPS.

More concretely, in the first step, that is, when errors in the signals such as the group command signal GC, the group identification signal GI, the digital identification signal DIS, the digital command signal DCS, etc. are detected, the CPU 10 displays the "NO ANSWER" message in the display 35 in steps 3b and 3c of FIG. 3. In the second step, that is, when errors such as the confirmation to receive signal CFR error and the training signal error are detected, the CPU 10 displays the error generation page in the display 35 in steps 3d and 3e of FIG. 3. In the third step, that is, when errors such as that of the message confirmation signal MCF, the end of message signal EOM, the multi-page signal MPS, etc. are detected, the CPU 10 displays a next page of the error generation page in the display 35 in steps 3f and 3g of FIG. 3. In the fourth step, that is, when a message data transmission and reception error is detected, the CPU 10 displays the error generation page in the display 35 in steps 3h and 3i of FIG. 3. In the fifth step, that is, when an error is detected in the fax line, the CPU 10 displays the error generation page in the display 35 in steps 3j and 3k of FIG. 3. Additionally, in case that a line busy signal is detected, the CPU 10 displays the "COMM. ERROR" (communication error) message in the display 35 in steps 3l and 3m of FIG. 3.

As mentioned above, the present invention has an advantage in that users can immediately know via the display what page of the document to be transmitted has not been transmitted upon the detection of errors during the transmission of a plurality of documents via the display.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment discloses as the best mode of the invention but rather than the present invention includes all embodiments falling within the scope of the appended claims.

What is claimed is:

1. A facsimile machine, comprising:
    a display for enabling a plurality of predetermined information representative of an operational status of the facsimile machine to be displayed thereon in accordance with a control signal generated during a transmission;
    a memory for storing data corresponding to said information representative of the operational status, including any error generation status occurring during a transmission of a document in the facsimile machine, said data comprising data representing any error page interrupted by a transmission failure; and
    a controller for monitoring said error generation status, and for providing the data representing an error page to said display for displaying the error page by accessing said memory upon the occurrence of the transmission failure; wherein said data representing any error page confirms a page following a page where an error was really generated as the error generation page in correspondence with errors related to a message confirmation signal, an end of message signal or a multi-page signal, and confirms said page as the error generation page in correspondence with errors related to a message data transmission and reception; a confirmation to receive signal, a training signal, or a line error.

2. The facsimile machine according to claim 1, said display comprising a liquid crystal display; wherein said data representing any error page confirms a page following a page where an error was really generated as the error generation page in correspondence with errors related to a message confirmation signal, an end of message signal or a multi-page signal, and confirms said page as the error generation page in correspondence with errors related to a message data transmission and reception, a confirmation to receive signal, a training signal, or a line error.

3. The facsimile machine according to claim 1, said predetermined information comprising alphanumeric characters; wherein said data representing any error page confirms a page following a page where an error was really generated as the error generation page in correspondence with errors related to a message confirmation signal, an end of message signal or a multi-page signal, and confirms said page as the error generation page in correspondence with errors related to a message data transmission and reception, a confirmation to receive signal, a training signal, or a line error.

4. A method for processing a transmission error by transmitting and receiving document and protocol data to another facsimile machine via a telephone line in a facsimile machine, having a display for enabling a plurality of predetermined information representative of an operational status of said facsimile machine to be displayed thereon in accordance with a control signal generated during a transmission, and a memory for storing data corresponding to said information representative of the operational status, including any error generation status during a transmission of a document by said facsimile machine, said data comprising data representing any error page interrupted by a transmission failure, the method comprising the steps of:
    checking whether or not the error is generated during a transmission of said document;
    reading when said error was generated, accessing said memory and data representing an error page corresponding to said error among variable errors, said data comprising a "no answer" message data, message data representing a next page of a page where an error was really generated as the error generation page, and message data representing a real error generation page, said data respectively corresponding to a group command signal, a group identification signal, a digital identification signal, and a digital command signal detecting error, said message data corresponding to a message confirmation signal, an end of message signal, and a multi-page signal, and said another message signal data corresponding to an error related to a message data transmission signal, a confirmation to receive signal, a training signal or a line error; and
    displaying a message corresponding to the data representing the error page, on said display, said data being read from said memory.

5. A method for displaying a transmission error page in a facsimile machine, the method comprising:
    determining whether there is a transmission error in the transmission of a plurality of documents by the facsimile machine;
    when it is determined that a transmission error has occurred, then determining whether the error is one of a group command detecting error, a group identification detecting error, or a digital command signal detecting error;
    when the transmission error is one of the group command detecting error, the group identification detecting error, or the digital command signal detecting error, then displaying a "NO ANSWER" message on a display of the facsimile machine;
    when the transmission error is determined not to be one of the group command detecting error, the group identification detecting error or the digital command signal detecting error, then determining whether the transmission error is one of a confirmation to receive error or a training signal error;
    when the transmission error is determined to be one of a confirmation to receive error or a training signal error, then displaying an error generation page on the display of the facsimile machine;
    when the transmission error is determined not to be one of the confirmation to receive error or the training signal error, then determining whether the transmission error is one of a message confirmation error, an end of message error, or a multi-page signal error;
    when the transmission error is determined to be one of the message confirmation error, the end of message error, or the multi-page signal error, then displaying a next page of error generation page on the display of the facsimile machine;

when the transmission error is determined not to be one of the message confirmation error, the end of message error, or the multi-page signal error, then determining whether the transmission error is one of a message data transmission error or a message data reception error;

when the transmission error is determined to be one of the message data transmission error, or the message data reception error, then displaying the error generation page on the display of the facsimile machine;

when the transmission error is determined not to be one of the message data transmission error or the message data reception error, then determining whether the transmission error is a line error;

when the transmission error is determined to be a line error, then displaying the error generation page on the display of the facsimile machine;

when the transmission error is determined not to be the line error, then determining whether the transmission error is a line busy condition;

when the transmission error is determined to be the line busy condition, then displaying a "COMM. ERROR" message on the display of the facsimile machine; and when the transmission error is determined not to be the line busy condition, then placing the facsimile machine in a stand-by state.

\* \* \* \* \*